United States Patent [19]
Tibi et al.

[11] Patent Number: 5,539,738
[45] Date of Patent: Jul. 23, 1996

[54] INFORMATION MULTIPLEXING DEVICE FOR TRANSMITTING CELLS VIA A COMMUNICATION NETWORK

[75] Inventors: Georges Tibi, Fontenay aux Roses; Jean-Michel Callemyn, Paris, both of France

[73] Assignee: U.S. Philips Corporation, New York, N.Y.

[21] Appl. No.: 221,149

[22] Filed: Mar. 30, 1994

[30] Foreign Application Priority Data

Mar. 31, 1993 [FR] France ................... 93 03776

[51] Int. Cl.⁶ .......................................... H04J 3/24
[52] U.S. Cl. .................... 370/60.1; 370/61; 370/94.1
[58] Field of Search .......................... 370/60.1, 60, 61, 370/62, 54, 55, 56, 84, 94.2, 94.3, 17, 85.2, 85.7, 94.1; 340/825.03, 826, 827; 379/271, 272, 273, 280

[56] References Cited

U.S. PATENT DOCUMENTS

| | | | |
|---|---|---|---|
| 4,597,075 | 6/1986 | Israel | 370/58.2 |
| 4,849,965 | 7/1989 | Chomel et al. | 370/85 |
| 5,072,442 | 12/1991 | Todd | 370/84 |
| 5,117,429 | 5/1992 | Lagoutte | 370/60 |
| 5,251,209 | 10/1993 | Jurkevich et al. | 370/60 |

FOREIGN PATENT DOCUMENTS 2670972  6/1992  France.

OTHER PUBLICATIONS

"Asynchronous Transfer Mode" Martin de Prycker, Published in Alice Warwood Editions, Great Britain.

Primary Examiner—Alpus H. Hsu
Assistant Examiner—Ricky Q. Ngo
Attorney, Agent, or Firm—Edward W. Goodman

[57] ABSTRACT

A communication system including a network and an information multiplexing device connected to the network is provided. The device includes a plurality of access terminals for receiving information to be transmitted, a plurality of connecting terminals coupled to the network, a plurality of service circuits having queue elements for storing the information, a plurality of network circuits which includes output circuits for transmitting information to the connecting terminals and an assigning element for assigning a period of time which information can be transmitted to the output circuits. The period of time being dependent on the rate of which the output circuit can transmit data.

6 Claims, 4 Drawing Sheets

INFORMATION MULTIPLEXING DEVICE FOR TRANSMITTING CELLS VIA A COMMUNICATION NETWORK

BACKGROUND OF THE INVENTION

1. Field of the Invention

The present invention relates to a communication system comprising a network and an information multiplexing device which device transmits information cells from one of its accesses to another access and comprises:

- a plurality of access terminals for users who have information to be transmitted to a certain destination at a certain rate,
- a plurality of connecting terminals for a plurality of accesses of said network,
- a plurality of service circuits which include queue elements for storing user data and for producing on the data outputs the cells to be transmitted,
- a common data line interconnecting the data outputs of said service circuits,
- a plurality of network circuits comprising output circuits whose inputs are connected to said data line and whose outputs are connected to said connecting terminals.

ATM networks are increasingly widespread and to utilize them to the maximum of the possibilities they present, it is suitable to multiplex the data the user wishes to transmit.

2. Description of the Related Art

A communication system of this type comprising a device that is capable of performing the multiplexing operation is known from French Patent Application No. 2 670 972.

This known device is formed by input nodes whose functions can be compared with said service circuits, and output nodes that can be compared with the network circuits.

All the nodes, both output and input nodes, are to have identical characteristic features because mixing operations are to be carded out for which any cell at the input of whatever input node can go to the output of whatever output node. However, with respect to multiplexing operations, when users are to be connected to an ATM network, they can use links which ensure different rates: fiber optics, telephone lines . . . The known device does not provide any special measure to adapt the output nodes to the rate offered by the link to which they are connected. As a result, queues occur at the output nodes in order to partly absorb these rate discrepancies.

SUMMARY OF THE INVENTION

The present invention proposes a communication system comprising a device which makes it possible thus to adapt the network circuits to the rate of the link to which they are connected and which does not need, of necessity, queues in the network circuits and management circuits these queues being assigned to these network circuits.

Therefore, a communication system of this type is characterized in that it further comprises:

- an assigning element for assigning periods of time in which cells can be taken from said data line to each one of the output circuits as a function of the flow rate of said output circuits.

The following description accompanied by the appended drawings, all given by way of non-limiting example, will make it better understood how the invention can be realised.

DETAILED DESCRIPTION OF THE PREFERRED EMBODIMENTS

Figure 1:
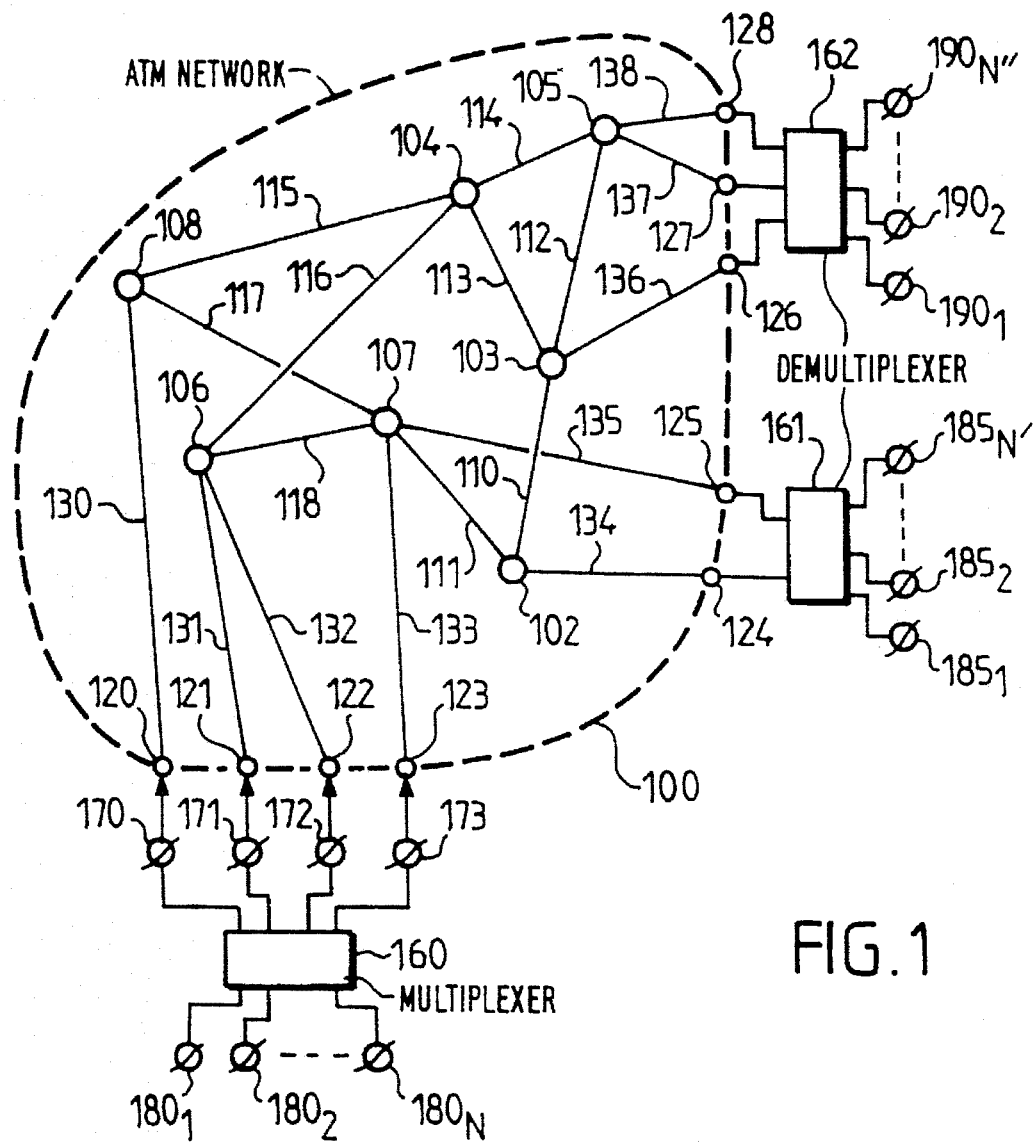
FIG. 1 shows a network to which a multiplexing device according to the invention is connected.
Figure 2:
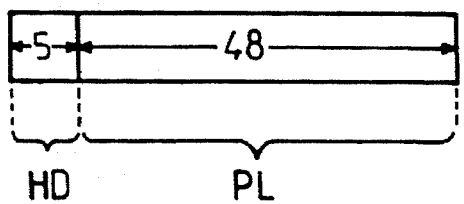
FIG. 2 shows the structure of information cells transmitted through the network.

FIG. 1 gives a diagrammatic representation of an ATM network referenced 100 in the drawing Figure. A description of the network may be found in the publication entitled "ASYNCHRONOUS TRANSFER MODE" by MARTIN DE PRYCKER, published in ALICE WARWOOD editions in Great Britain. This network is formed by various nodes 102, 103, 104, 105, 106, 107 and 108, interconnected by links 110 to 118 to connect the nodes 102–103, 102–107, 103–105, 103–104, 104–105, 104–108, 104–106, 107–108 and 106–107, respectively. Various accesses to this network are referenced 120 to 128. These accesses are connected to the nodes 108, 106, 107, 102, 103 and 105, respectively, via links 130 to 138. These accesses are further connected to various multiplexing and demultiplexing devices 160, 161 and 162. Among these devices there are a multiplexing device 160, the object of the present invention, and two demultiplexing devices 161 and 162 which perform the reverse operations to those of the multiplexing device 160. For a connection to the four accesses 120, 121, 122 and 123, the multiplexing device 160 comprises four connecting terminals 170, 171, 172 and 173. Thus, within the framework of the example described, the information signals can go from the device 160 to the devices 161 and 162 by passing through network 100. These information signals to be transmitted are applied to a plurality of access terminals $180_1$ to $180_N$ of the multiplexing device 160 and can be produced, among other things, on output terminals $185_1$ to $185_N$ of device 161 and $190_1$ to $190_N$ of device 162. The information signals transmitted in the network are presented in the form of cells whose structure is shown in FIG. 2. These cells are formed by 53 octets: 5 of them constitute the header HD and the other 48 octets PL contain the data for a transmitting service which data are accompanied, as required, by additional information signals to reconstitute the data of this service on reception.

Figure 3:
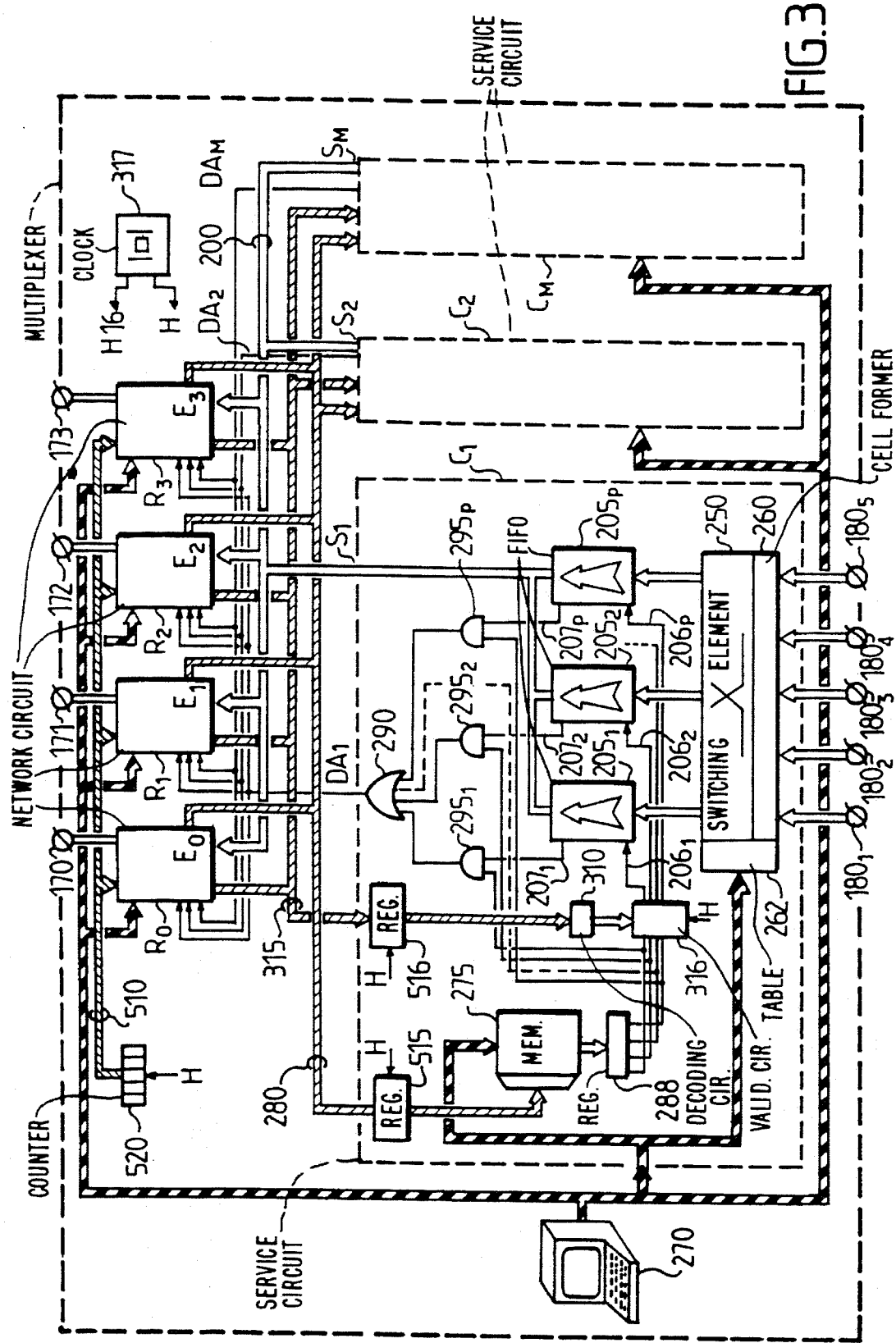
FIG. 3 shows a multiplexing device according to the invention.

FIG. 3 shows an embodiment for a multiplexing device according to the invention.

The multiplexing device is formed by a plurality of service circuits $C_1, C_2, \ldots, C_M$ each having an output $S_1, S_2, \ldots, S_M$ respectively, connected to a common data line 200 and a plurality of network circuits $R_0, R_1, R_2$ and $R_3$ having each an input $E_0, E_1, E_2$ and $E_3$ also connected to this common line 200.

To each of the service circuits $C_1, C_2, \ldots, C_M$ are connected user access terminals: the terminals $180_1$ to $180_5$ for the service circuit $C_1$ and the terminals $180_6$ to $180_N$ (not shown in FIG. 3) for the other service circuits. In principle, each service circuit $C_1, C_2, \ldots, C_M$ is assigned to a given service. For example, service circuit $C_1$ is assigned to video links of the video conferencing type, service circuit $C_2$ to telephone links and service circuit $C_M$ to local network extensions.

Each service circuit $C_1, C_2, \ldots, C_M$ comprises at least one queue element formed by a memory of the FIFO type (first in first out). This is realized in practice by means of a read/write memory which comprises independent reading and writing circuits. Reference numerals $205_1$ to $205_p$ denote the various queue elements contained in circuit $C_1$. These elements make it possible to store various information cells before they pass through the network 100. Two wires, i.e., $206_1$ to $206_p$ and also $207_1$ to $207_p$ are assigned to each of these queue elements to transmit a read control signal and an empty memory signal, respectively, or, termed differently, a signal to indicate whether the memory contains or does not contain at least one cell. A switching element 250 makes it possible to switch the various access terminals to the queue elements $205_1$ to $205_p$. This switching element 250 can be coupled to a cell former 260 in the case where the cells will not be formed at the user's. There is no need to describe this in more detail, because the invention does not relate thereto. The switching performed by element 250 is defined by a Table 262. This Table is written by means of a management circuit 270 which may be formed by a personal computer PC to provide correspondence between one of the access terminals $180_1$ to $180_5$, to which a user is connected, and one of the queue elements $205_1$ to $205_p$.

A Table formed by a memory 275 makes it possible to manage, inside the service circuits, the access of various queue elements to line 200. This Table, which is also written by means of the management circuit 270, makes it possible to assign a queue element to a destination code which is a concatenation of a VPI (Virtual Path Identifier) and a network access identifier. The VPI is formed by 8 bits, and since the number of network accesses is 4 in the described example, a given destination is thus represented by a code of 10 bits. This Table is addressed by various destination codes which come from a first service line 280 shared by all the service circuits $C_2, \ldots, C_M$. This Table correspondingly produces the code which validates or does not validate a queue element $205_1$ to $205_p$. This validation code is stored in a register 288. An OR-gate 290 produces a signal DA1 which, when active, signals that at least one queue element of service circuit $C_1$, denoted by the access code, contains at least one cell. This is determined by a set of AND-gates $295_1$ to $295_p$ with two inputs, of which a first input receives the assignment signal coming from the register 288 and the second input receives the signal transmitted via the wires $207_1$ to $207_p$. The inputs of the OR-gate 290 receive the output signals from the AND-gates $295_1$ to $295_p$.

As each service circuit is assigned an identification code, a decoding circuit 310 produces an active signal when a code corresponding to the identification code of the service circuit is transmitted via a second service line 315. The decoding signal coming from decoding circuit 310 makes it possible to select one of the queue elements if one of them is involved in this operation via a validation circuit 316 which allows the codes contained in register 288 to pass with each edge of a signal H produced by a clock 317 and, as a result, activates the reading of the queue element concerned, so that a cell is transmitted over line 200.

Figure 4:
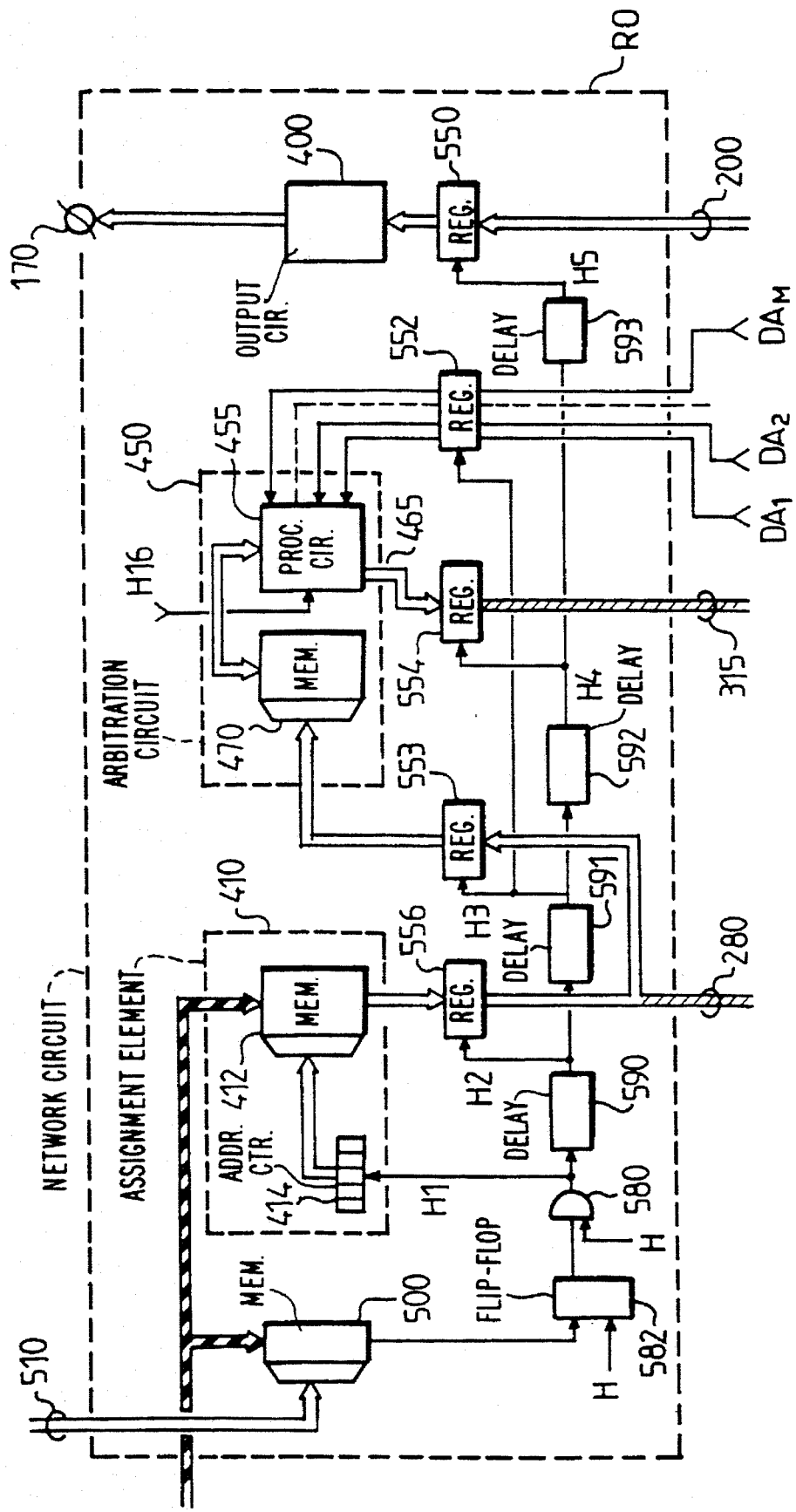
FIG. 4 shows a network circuit forming part of the device shown in FIG. 3.

FIG. 4 gives a representation in more detail of the structure of the network circuit $R_0$ there being understood that the other circuits $R_1$, $R_2$ and $R_3$ may have the same structure.

The network circuit $R_0$ comprises an output circuit 400 connecting the common line 200 to the connecting terminal 170.

The network circuit $R_0$ also includes an assigning element 410 for producing destination codes in well-defined periods of time.

Assigning element 410 comprises an assignment Table formed by a read/write memory 412 which contains destination codes spread in a manner which will be explained hereinafter and includes a Table reading element provided for reading said destination codes. The reading element is formed by an address counter 414 of said memory. This address counter counts the pulses H1 at a fixed rate, so that the memory is permanently read in a cyclic manner.

This network circuit $R_0$ further includes an arbitration circuit 450. This arbitration circuit is formed by a processing circuit 455 whose outputs 465 produce the identification code of the service circuit to which the access to line 200 is given. A status memory 470 contains previous statuses and especially the identification code of the last service circuit that has gained access to one of the 256 accessible destinations from this network access, the VPI field having a width of 8 binary elements. The inputs of the processing circuit 455 are formed, on the one hand, by the signals $DA_1$, $DA_2$, $\ldots$, $DA_M$ passing through a buffer register 472 and, on the other hand, by the destination code transmitted by the line 280.

According to the invention, the information multiplexing device further includes an assigning element for assigning periods of time in which cells on said data line 200 are taken to each of the output circuits as a function of the flow rate of said output circuits. This element is formed by an assignment Table which occurs in the form of a memory 500 addressed by a code of numbers of periods of time TS which, this time code being transmitted by a line 510 shared by all the network circuits $R_0$, $R_1$, $R_2$ and $R_3$. These time codes are processed by a counter 520 (FIG. 3) which counts the pulses of the signal H.

Memory 500 is structured in single-bit words and has a number of locations equal to the counting capacity of the counter 520. In the framework of this example: 64. Indications on the assignment are stored at the locations of this memory 500. Thus, a logic "1" is stated to denote that this time code indicates the network circuit and a "0" to denote that it is not indicated. This memory 500 is preprogrammed by the management circuit 270 in a manner to be described hereinbelow.

If the transmit rates of the network circuits are low, their number may be modified without saturating the line 200 as regards its transmission capacity.

According to another aspect of the invention, the information multiplexing device described comprises pipeline registers which authorize a pipeline operation. These various registers are timed at the rate of the clock signal H.

In the service circuit $C_1$, pipeline registers 515 and 516 are inserted into the service lines 280 and 315. The other service circuits $C_2$ to $C_M$ naturally also comprise like registers.

In the network circuit $R_0$, a first pipeline register 550 interconnects the common data line 200 with the output circuit 400; this register is loaded at the rate of a signal H5. A second register 552 and a third register 553, loaded at the rate of a signal H3, produce the various information signals to be processed by the arbitration circuit 450. On the one hand, the register 552 receives the various signals $DA_1$ to $DA_M$ and, on the other hand, the register 553 receives the code transmitted via the service line 280. The information processed by this arbitration circuit 450 is received by a fourth register 554 at the rate of a signal H4. A fifth register 556 interconnects the output of the assigning element 410 with the service line 280.

The signals H2, H3, H4 and H5 are derived from the signal H1 by successive time shifts which are each equal to a period of the signal H. The signal H1 is derived from signal H by an AND-gate 580 which has two inputs, one input receiving the signal H and the other input the value of the bit contained in the memory 500 validated prior to that operation. This validation takes place at the rate of the signal H by a flip-flop 582.

Delay elements 590, 591, 592 and 593 arranged in a cascade combination with the output of the gate 580 produce the respective signals H2 to H5. These delay elements produce a delay equal to said period of the signal H.

The operation of the information multiplexing device according to the invention is the following.

a) - FUNCTIONS OF THE MANAGEMENT CIRCUIT

This management circuit 270 forms the interface between a manager handling this circuit and the users, on the one hand, and a network manager, on the other.

The manager decides on the connections to be made between the various access terminals and the queue elements. The device manager communicates with the network manager to reserve an access having a certain rate. After the request the network manager produces a destination code which represents in abridged form, as it has been informed, the destination desired by the recipient. It is from this management circuit that the various memory Tables 262, 275, 412, 470 and 500 are loaded as a function of the traffic to be handled.

b) - ASSIGNMENT OF THE PERIODS OF TIME FOR CELLS TO BE TAKEN OFF BY THE NETWORK CIRCUITS

Within the framework of the example described, the cells can be sent over each access line to the network 100 at a maximum rate of 149.76 . $10^6$ bit/s (bits per second). The time codes TS vary from 0 to 63 and, therefore, the counter 520 is a modulo-64 counter. As the network circuits are all used for transmitting at this maximum rate, a maximum of 16 time codes TS from the 64 are assigned to each of the network circuits. For identical network circuits, the assigned time codes TS are to be separated by at least 3 time codes TS. The period of the signal H is thus 707.5 ns.

Figure 5:
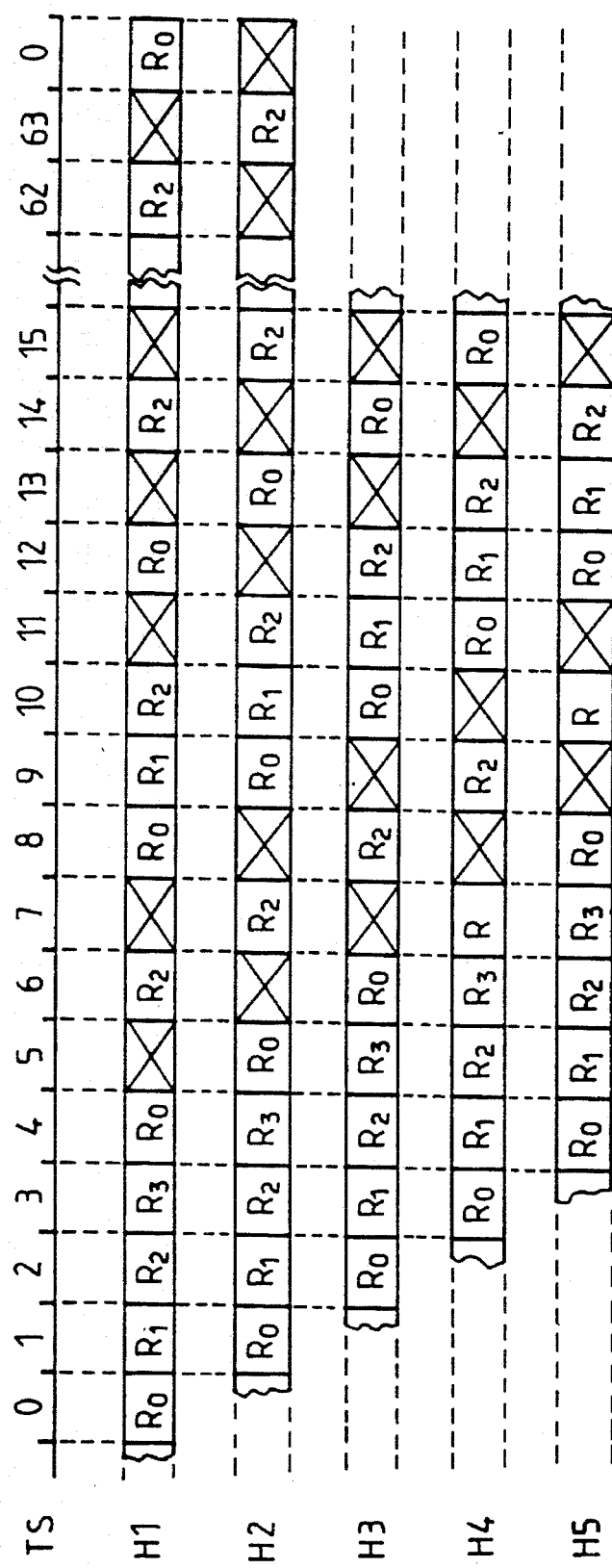
FIG. 5 shows a time diagram which represents the pipeline function of the device according to the invention.

In FIG. 5, there is shown an example of the assignment of these periods of time TS. Thus network circuit $R_0$ is assigned to the maximum rate, 16 time codes TS are assigned to this network circuit, that is to say: the time codes "0", "4", "8", "12", . . . Network circuit $R_1$ is assigned to a twice smaller rate. The time codes TS "1", "9", . . . are assigned to this network circuit $R_1$. Network circuit $R_2$ is also assigned to this maximum rate, the time codes "2", "6", "10", "14", . . ., "62" are assigned to this network circuit $R_2$. Network circuit $R_3$ is assigned to a low rate and a single time code TS, that is "4", is assigned to this network circuit $R_3$.

c) - OPERATION OF THE ASSIGNING CIRCUIT 410

This assigning circuit 410 defines periods of time during which the line 200 common to the queue elements contained in the various circuits $C_1, C_2, \ldots, C_M$ is accessible, so that cells are transmitted to connecting terminal 170 via the common line 200 and the output circuit 400. Memory 412 contains destination codes spread in a manner to be explained hereinafter and the read counter 414 is provided for addressing this memory at a rate of the signal H1, so that the memory is permanently read in a cyclic manner. This determines the rate at which said destination codes appear.

This memory 412 is also programmed from the management terminal 270. A manager takes the rate requests for the various destinations into account and formulates a request to obtain the necessary resources of the network for the intended traffic. This request is transferred to the network manager which produces the destination code formed by a VPI and a code which identifies the network access circuit. The manager then writes this destination code in the memory 412 as a function of the following considerations.

The rate of the clock pulses determines the maximum rate that can be transmitted. Let us take a practical example of 149.76 . $10^6$ bit/s (bits per second), thus the period for the pulses H1 cannot be smaller than 2.83 μs. Then, if the traffic necessary for a destination has this maximum rate, all the locations of the memory will be involved in this service. The size of this memory is partly defined by the minimum rate $d_{min}$ to be ensured, for example: 4.5 $10^3$ bit/s. The size of the memory is thus 32768 locations. This size is also defined by the granularity of the rates at which transmission is to take place, that is to say, all the different rates at which it is possible to transmit. The larger the number of possible rates, the larger the Table.

d) - ARBITRATION CIRCUIT

Memory 470 contains as many memory locations as there are possible VPI codes: 256. The selected arbitration mechanism is that of rotating priority for each of the destinations described in "DISTRIBUTED-PROCESSOR COMMUNICATION ARCHITECTURE" by Kenneth J. Thurber and Gerald M. Mason, published in Lexington Books, Heatch., chapter 5, pp. 140 and 141. If this mechanism is used, the memory 470 does not need any initialization.

The priority is determined in various phases of calculation determined by a clock signal H16 which has a rate 16 times higher than that of the signals H.

The arbitration context for a given destination is stored in memory 470 at an address derived from the VPI number that corresponds to this destination.

An arbitration sequence is then formed in the following phases:
 the arbitration context relating to the VPI code is read from memory 470,
 the arbitration between the various access circuits is carried out according to the mechanism of rotating priority,
 the code of the circuit that has gained access is transmitted by line 315,
 the new arbitration context relating to the VPI destination code is written in memory 470.

e) - FUNCTIONING OF THE PIPELINE

FIG. 5 gives a good illustration of this functioning.

When TS="0", a value "1" bit is present at the output of the flip-flop 582 of the network circuit, which causes signal H1 to appear. This is the assignment phase.

When TS="1", the destination code coming from the memory 412 of the network circuit is transmitted over service line 280. This is the call phase for a destination.

This code is analyzed at each service circuit by means of memory 275. If one of the queue elements is involved in this destination, the signal $DA_1$ is active. The signals $DA_1$ to $DA_M$ coming from all the service circuits are analyzed by the network circuit $R_0$ when TS="2". This is the phase in which an access to the data line is requested.

The arbitration circuit of the network circuit $R_0$ gives its verdict when TS="3". This is the phase in which an access to the common line is given.

When TS="4", the cell of the queue element involved is transmitted over the data line. This is the data transmission phase.

We claim:

1. A communication system including a network having a plurality of accesses for inputting information into said network and an information multiplexing device coupled to more than one of said plurality of accesses for transmitting information from one access to a second access, said information multiplexing device comprising:

a plurality of input terminals for receiving information to be transmitted from one access to a second access;

a plurality of output terminals, each of said output terminals coupled to one of said accesses;

a plurality of service circuits coupled to said plurality of input terminals including a queue element for storing said information;

a common data line coupled to an output of each of said service circuits; and a plurality of network circuits, each network circuit including an output circuit having an input coupled to said common data line and an output coupled to one of said output terminals; and an assigning element for assigning a period of time in which information can be received by one of said network circuits from said common data line as a function of a flow rate of said output circuit.

2. The communication system of claim 1, wherein said assigning element includes an assignment table for storing an assignment indication and a generating circuit for transmitting said assignment indication at a predetermined time.

3. A communication system as claimed in claim 1, wherein said assigning element is included in one of said network circuits and wherein said assigning element generates access time codes for access to said common data line for each queue element.

4. The communication system as claimed in claim 3, wherein each of said service circuits includes more than one queue element and wherein each network circuit includes an arbitration circuit for determining a queue element authorized to transmit a cell when more than one of said queue elements include information to be transmitted.

5. The communication system as claimed in claim 1, wherein one of said network circuits includes a pipeline register interposed between said common data line and said output circuit.

6. A communication system for an asynchronous transfer mode (ATM) network including a network having a plurality of accesses for inputting information into said network and an information multiplexing device coupled to more than one of said plurality of accesses for transmitting information from one access to a second access, said information multiplexing device comprising:

a plurality of input terminals for receiving information to be transmitted from one access to a second access;

a plurality of output terminals, each of said output terminals coupled to one of said accesses;

a plurality of service circuits coupled to said plurality of input terminals including a queue element for storing said information;

a common data line coupled to an output of each of said service circuits; and a plurality of network circuits, each network circuit including an output circuit having an input coupled to said common data line and an output coupled to one of said output terminals; and an assigning element for assigning a period of time in which information can be received by one of said network circuits from said common data line as a function of a flow rate of .said output circuit.

* * * * *